United States Patent [19]
Mitchell, Sr.

[11] Patent Number: 5,711,503
[45] Date of Patent: Jan. 27, 1998

[54] CUP HOLDER FOR USE ON A TRANSIT BUS

[76] Inventor: Eugene Mitchell, Sr., 888 Hammel St., Akron, Ohio 44306

[21] Appl. No.: 527,857

[22] Filed: Sep. 14, 1995

[51] Int. Cl.⁶ ..................................................... A47K 1/08
[52] U.S. Cl. .................. 248/311.2; 248/240; 248/292.13
[58] Field of Search .............................. 248/311.2, 310, 248/309.1, 329.17, 292.13, 240; 224/926

[56] References Cited

U.S. PATENT DOCUMENTS

| | | | |
|---|---|---|---|
| 2,574,250 | 11/1951 | Dalton | 16/144 |
| 2,588,596 | 3/1952 | Weber | 248/311 |
| 3,128,984 | 4/1964 | Palm | 248/311 |
| 3,994,465 | 11/1976 | Rudnitzky | 248/311.1 |
| 4,270,722 | 6/1981 | Batchelder | 248/311.2 X |
| 4,957,254 | 9/1990 | Hill et al. | 248/311.2 X |
| 5,022,626 | 6/1991 | Nozel et al. | 248/311.2 |
| 5,060,899 | 10/1991 | Lorence et al. | 248/311.2 |
| 5,139,222 | 8/1992 | Koorey et al. | 248/311.2 |
| 5,141,194 | 8/1992 | Burgess et al. | 248/311.2 |
| 5,143,337 | 9/1992 | Tomayko, Jr. et al. | 248/311.2 |
| 5,190,257 | 3/1993 | Gradel et al. | 248/231.7 |
| 5,238,211 | 8/1993 | Borovski | 248/311.2 |
| 5,289,962 | 3/1994 | Tull et al. | 224/273 |
| 5,295,650 | 3/1994 | Brandt | 248/311.2 |
| 5,318,266 | 6/1994 | Liu | 248/311.2 |
| 5,328,143 | 7/1994 | Koorey et al. | 248/311.2 |
| 5,330,145 | 7/1994 | Evans et al. | 248/311.2 |
| 5,379,978 | 1/1995 | Patel et al. | 248/311.2 |
| 5,439,193 | 8/1995 | Coulter et al. | 248/206.3 |
| 5,445,350 | 8/1995 | Rigsby | 248/311.2 X |

*Primary Examiner*—Ramon O. Ramirez
*Attorney, Agent, or Firm*—Oldham & Oldham Co., L.P.A.

[57] ABSTRACT

A cup holder designed to be attached to a transit bus fare collection box, for use by a transit bus driver to retain beverage containers in a predetermined position. The invention includes an attachment member designed to engage the fare collection box. A shelf member is connected to the attachment member and extends outward in its operative position to provide a substantially horizontal surface upon which a bus driver can place beverage containers, and other items. The shelf member is preferably provided with apertures or indentations designed to receive the beverage containers and secure the containers in position on the shelf member. In the preferred embodiment, the attachment member is provided in the form of a frame member that engages the fare collection box, and the shelf member is pivotally attached to the frame member such that the shelf member may be folded to an upward or downward position to lie against the fare collection box when the cup holder is not in use.

8 Claims, 4 Drawing Sheets

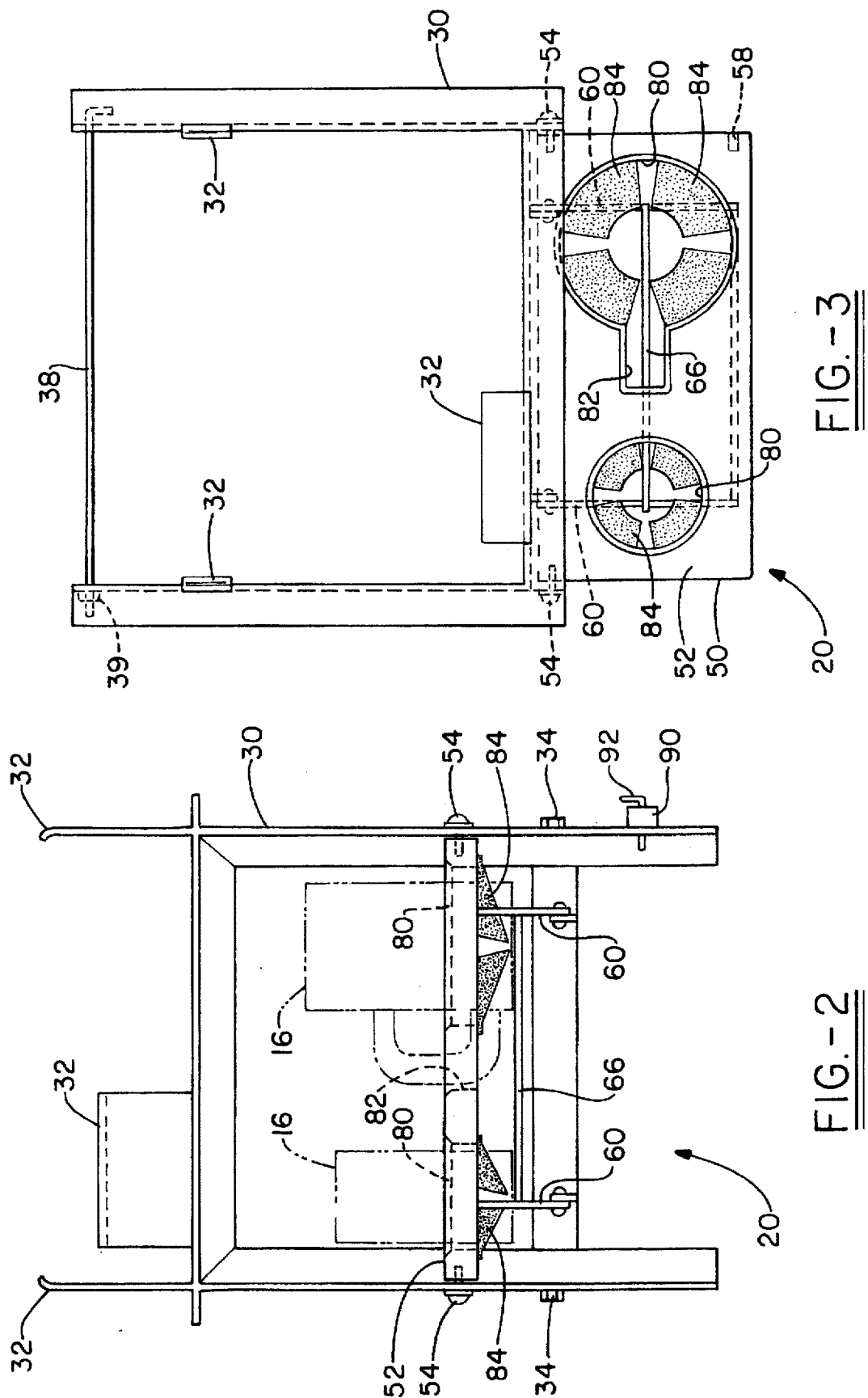

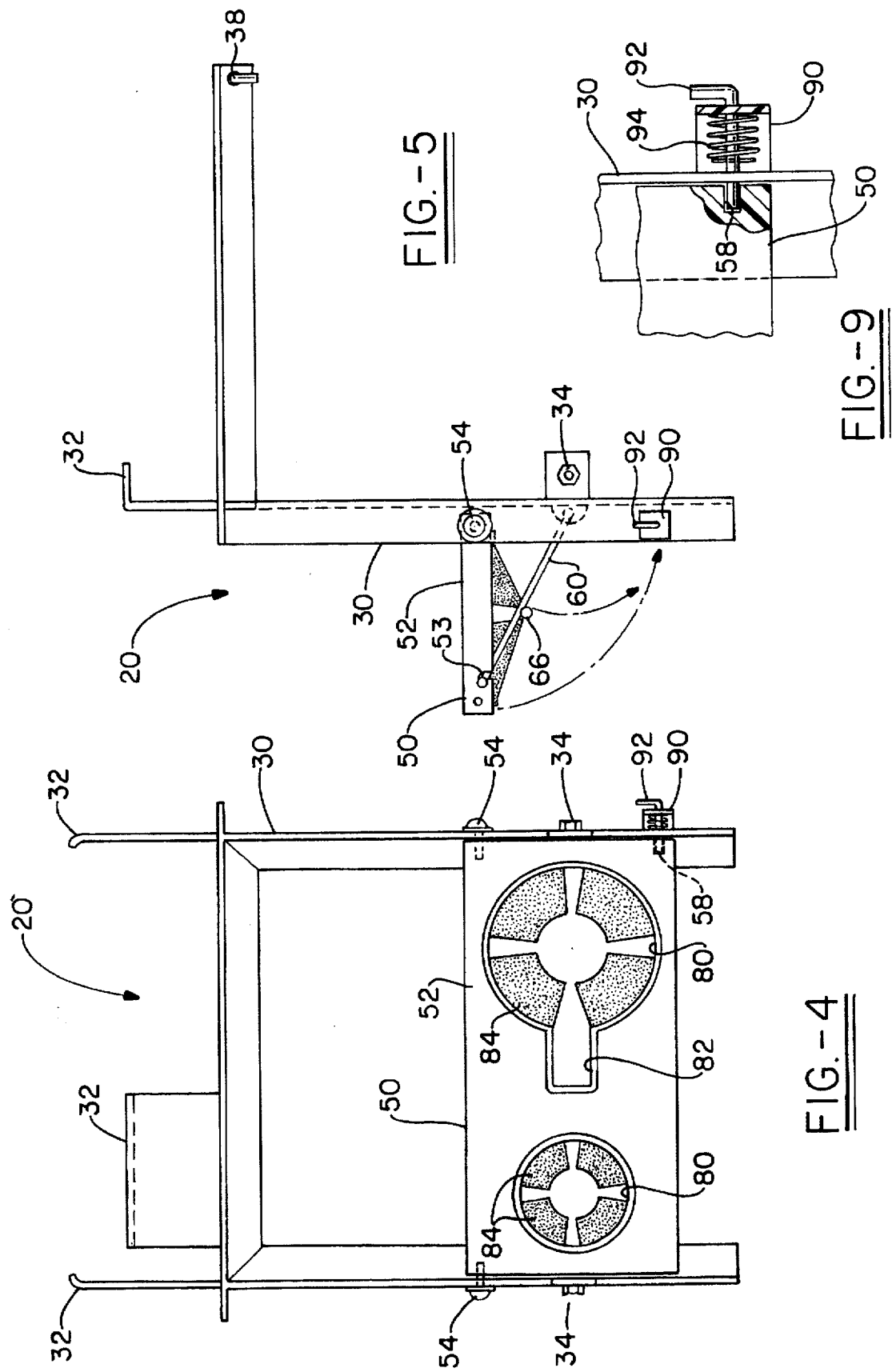

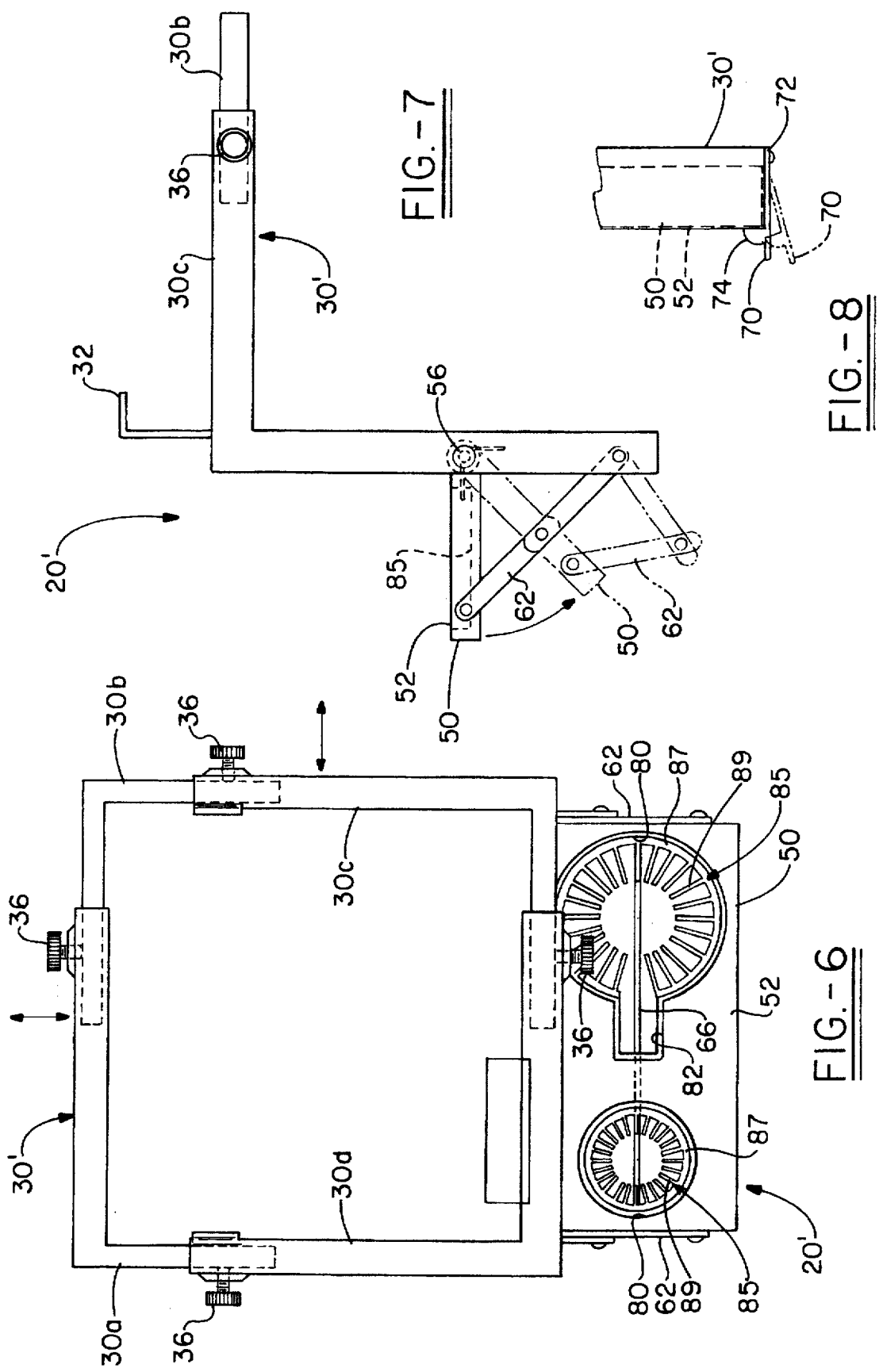

CUP HOLDER FOR USE ON A TRANSIT BUS

FIELD OF THE INVENTION

The present invention relates generally to cup or beverage holders, and more particularly to a cup holder designed to be attached to a transit bus fare collection box to provide a safe and convenient location for a transit bus driver to place open beverage containers such as coffee cups, soda pop cans, water bottles and the like such that the beverage containers are secured in position to minimize the risk that the contents thereof will be spilled.

BACKGROUND OF THE INVENTION

While cup holders for use in motor vehicles are generally known, there has heretofore not been known a suitable cup holder for use by transit bus drivers. Transit bus drivers operate very large motor vehicles on congested city streets in all weather conditions, and at all hours of the day and night. Adding to the stress of the drivers job, numerous passengers are typically riding on the bus and the passengers may be talking, laughing, or otherwise distracting the driver. The driver therefore needs to be comfortable and alert while driving. Transit bus drivers therefore often drink coffee, water, soda pop, and other beverages while driving.

Because known cup holders are not well suited for use on transit buses, drivers have resorted to placing their open drink containers in various positions such as on the floor, on the dashboard, and other equally precarious locations. Not only are such locations for open drink containers inconvenient, the drinks often spill, creating a potentially dangerous condition. Should a bus driver spill hot coffee on himself or herself, the driver, the passengers, and other motorist could be injured during the ensuing confusion.

Transit buses or like vehicles present special difficulties to designing a suitable cup holder. To maximize the number of seats on a transit bus, the space provided for the bus driver is typically very small and cramped. To inform the driver of the condition of the engine and other bus systems, numerous gages and indicator lights are provided on the dashboard, leaving no room to mount an ordinary cup holder without obstructing the driver's view of one or more of the gages and lights. The fare collection box is typically located immediately adjacent to the bus driver so that the driver can supervise the passengers as they deposit their fare money therein. The fare collection box is placed close to the driver to maximize the aisle space provided for embarking or disembarking passengers, and to provide an unobstructed exit form the bus in the case of an emergency. Finally, transit buses are subjected to very harsh conditions and use. City streets are often in bad repair and bumps can be violent to the bus components, the driver, and passengers. The buses may be operated around the clock with several different drivers in one day. This constant use can wear out ordinary cup holders as are known for use with automobiles.

SUMMARY OF THE INVENTION

The present invention is therefore directed to a cup holder designed to be attached to a transit bus fare collection box, for use by a transit bus driver to retain beverage containers in a predetermined position. The invention comprises an attachment member designed to engage the fare collection box. A shelf member is connected to the attachment member and extends outward in its operative position to provide a substantially horizontal surface upon which a bus driver can place beverage containers, and other items. The shelf member is preferably provided with apertures or indentations designed to receive the beverage containers and secure the containers in position on the shelf member. In the preferred embodiment, the attachment member is provided in the form of a frame member that engages the fare collection box, and the shelf member is pivotally attached to the frame member such that the shelf member may be folded to an upward or downward position to lie against the fare collection box when the cup holder is not in use.

BRIEF DESCRIPTION OF THE DRAWINGS

FIG. 2 shows a front elevational view of a cup holder in accordance with the present invention in its operative position (with beverage containers shown in broken lines);

FIG. 3 is a top view of the cup holder illustrated in FIG. 2;

FIG. 4 is front elevational view showing a cup holder in accordance with the present invention as it may be stored in a downwardly folded position;

FIG. 5 shows a side elevational view of a cup holder in accordance with the present invention, and a manner in which it may be folded for storage;

FIG. 6 is a top view of an alternative embodiment of a cup holder in accordance with the present invention wherein an adjustable frame member is provided;

FIG. 7 is a side elevational view illustrating an alternative embodiment of the present invention;

FIG. 8 illustrates latch mechanism for retaining the cup holder in a folded position for storage;

FIG. 9 illustrates an alternative latch mechanism to that shown in FIG. 8;

DETAILED DESCRIPTION OF THE PREFERRED EMBODIMENT

Figure 1:
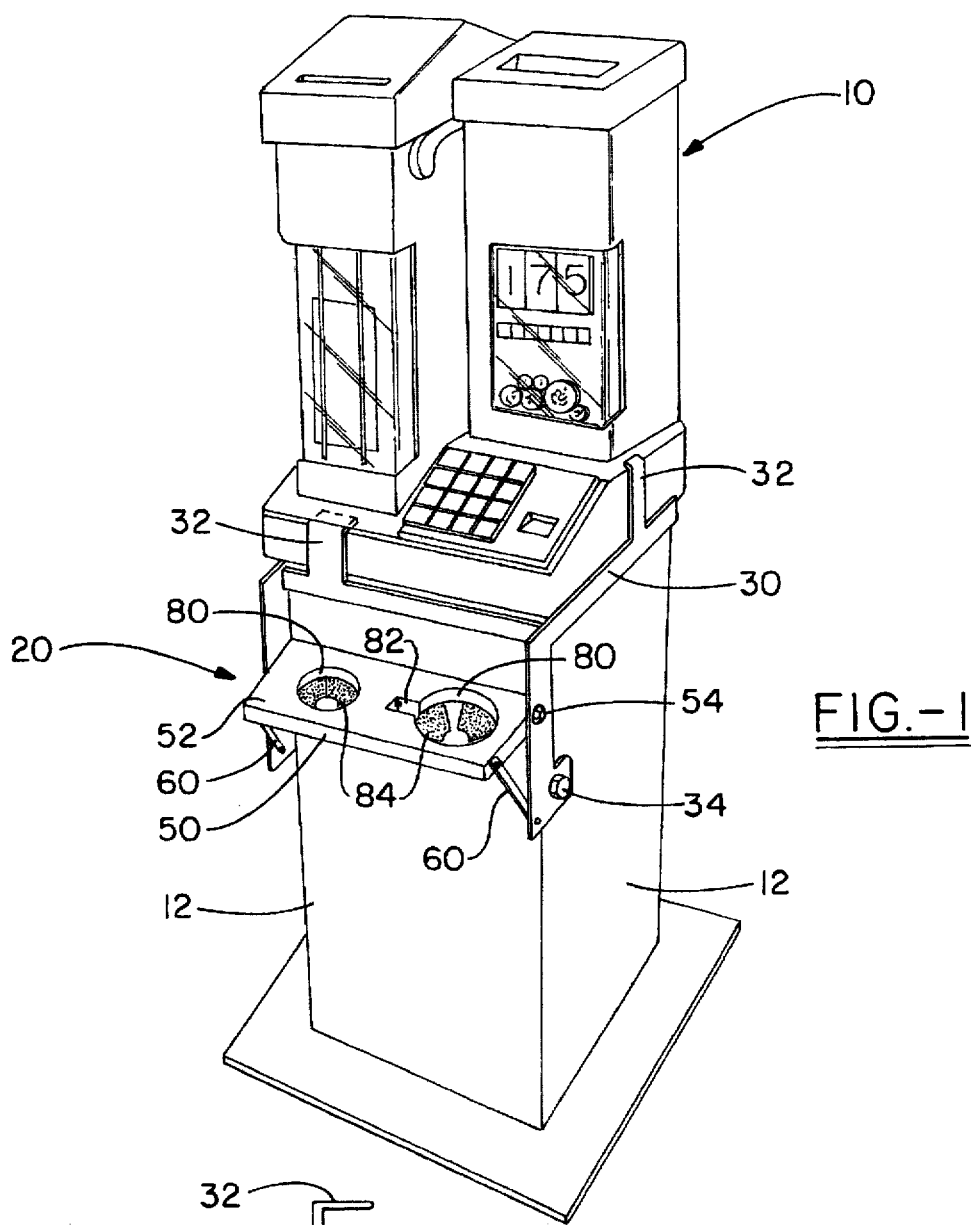
FIG. 1 is a perspective view of a cup holder in accordance with the present invention as/it may be attached to a transit bus fare collection box.

Reference will now be made in detail to the preferred embodiments of the invention, examples of which are illustrated in the accompanying drawings. Wherever possible, the same reference numerals will be used throughout the drawings to refer to the same or like pans.

FIG. 1 shows a transit bus fare collection box 10 and the cup holder of the present invention generally at 20 as it may be attached to fare collection box 10. Various types and configurations of transit bus fare collection boxes exist, and the invention is contemplated for use in conjunction with any transit bus fare collection box. The particular fare collection box 10 and the arrangement for connecting the cup holder 20 thereto as shown herein are provided as an example only, and the invention is not meant to be limited thereto. As shown, cup holder 20 includes an attachment member, which in the preferred embodiment is a frame member 30, for being selectively and releasably connected to fare collection box 10. Frame member 30 is designed to engage various surfaces of fare collection box 10 such that frame member 30 is substantially immovable relative to fare collection box when cup holder 20 is installed in a transit bus. Frame member includes one or more hook-type members 32 designed to engage substantially horizontal surfaces of fare collection box 10, and includes set screws 34 for engaging substantially vertical surfaces such as the sides 12 of fare collection box 10. Frame member 30 may include a removable component 38 (FIG. 3) that may be selectively removed for installation of cup holder 20 on a fare collection box 10. Once cup holder 20 is in position on the fare collection box as desired, removable component 38 may be connected to frame member 30 using a nut 39 to retain frame member 30 in position on fare collection box 10.

Referring again to FIG. 1, it can be seen that cup holder 20, includes a cup or other beverage container retaining member such as shelf member 50 connected to frame member 30 and extending therefrom such that shelf member 50 provides a substantially horizontal surface 52 upon which a transit bus driver may place a beverage container. Shelf member 50 is preferably pivotally connected to frame member 30 using bolts 54 or any other suitable fastener or hinge such that shelf member 50 may be pivoted from its operative position where it presents a substantially horizontal surface for supporting beverage containers, to at least one folded or storage position where shelf member 50 folds downward or upward to lie adjacent to fare collection box 10. In this manner, shelf member 50 may be folded out of the way of the transit bus driver when the cup holder 20 is not in use, such as, for example, when the transit bus driver must enter or exit the driver's seat.

In a preferred embodiment, one or more support members 60 are pivotally connected to frame member 30 (FIGS. 1 and 5) and are selectively engageable with a notch 33 provided in underside of shelf member 50. As may be seen most clearly in FIG. 5, shelf 50 may be manually lifted from its storage position, and support members 60 placed in notch 53 such that shelf 50 is supported in a substantially horizontal position by support members 60. Various other arrangements for providing operative and storage positions for shelf member 50 may be utilized. For example, FIG. 7 shows an alternative embodiment of the cup holder 20 wherein shelf member 50 is pivotally connected to frame member 30' utilizing a spring-loaded hinge 56. One or more foldable support members 62 are provided such that shelf member 50 may be folded downward against the force of spring-loaded hinge 56 for storage as is shown in phantom. A latch is provided, as is discussed fully below, to retain shelf member 50 in the downwardly (or upwardly) folded storage position against the force of spring-loaded hinge 56. When the transit bus driver desires to use the cup holder 20', the shelf member is released from the latch mechanism such that shelf 50 pivots upward to a substantially horizontal position under the force of spring-loaded hinge 56. Foldable support member 62 fully extend to provide additional support to shelf member 50.

Shelf 50 may include an engaging means for retaining the beverage containers in a fixed position once they are placed on surface 52 of shelf 50 by a bus driver to prevent the beverage containers from moving laterally relative to shelf 50. As shown herein, shelf 50 includes one or more bores 80 formed therein for receiving and retaining beverage containers (shown in broken lines in FIG. 2 at 16). At least one of bores 80 may include a cut-out 82 for receiving a coffee mug handle. As shown, a cup or beverage container support 66, which may be connected to shelf support member 60 is positioned beneath bores 80 when shelf 50 is in its operative position such that any beverage containers placed in bores 80 are supported therein. Cup support 66 may be provided in any suitable form. For example, as shown, cup support 66 is provided as an elongated member located beneath bores 80. Alternatively, cup support 66 may be provided in the form of a shelf member located beneath shelf member 50.

Bores 80 may be shaped such that no cup support 66 is required. For example, bores 80 could be provided as counterbores such that a flange is provided therein upon which a cup or other beverage container could be supported. Also, rather than forming bores 80 in shelf member 50, one or more depressions or indentations 80' (FIG. 10) may be formed in surface 52 of shelf member 50 of the appropriate size to receive a beverage container. In this manner, shelf 50 supports the beverage container while the container is prevented from sliding across shelf 50 due to its location in the formed depressions 80'. Bores 80 are provided with a type of engaging member 84, being a flexible rubber or similar skirt extending inward from the sides thereof for frictionally engaging any beverage container placed in bore 80. In this manner, a beverage container of any size is firmly retained in bore 80 to prevent spillage.

FIGS. 6 and 7 show an alternative embodiment of the cup holder at 20' wherein an adjustable frame member 30' is provided for connecting cup holder 20' to a wide variety of fare collection boxes having different dimensions. Frame member 30' comprises four components 30a, 30b, 30c, 30d that are slidably engaged with one another and frictionally engaged in a predetermined position utilizing adjustment set screws 36. Screws 36 may be loosened to allow frame components 30a–d to be adjusted relative to one another. Upon screws 36 being tightened, frame components 30a–d are frictionally engaged with one another such that frame member 30' is provided of any size desired within the limits imposed by the dimensions of frame components 30a–d. Also in this embodiment, the holes 80 may include an engaging member 85, which may be a circular insert positioned within a counterbore in the shelf 50. The insert may have a plastic housing 87 which carries a plurality of bristles 89 extending inwardly therefrom in a radial direction. The bristles 89 frictionally engage a cup or other container while accommodating differences in the size or diameter of the container. It should also be recognized that other engaging members are possible.

Figure 10:
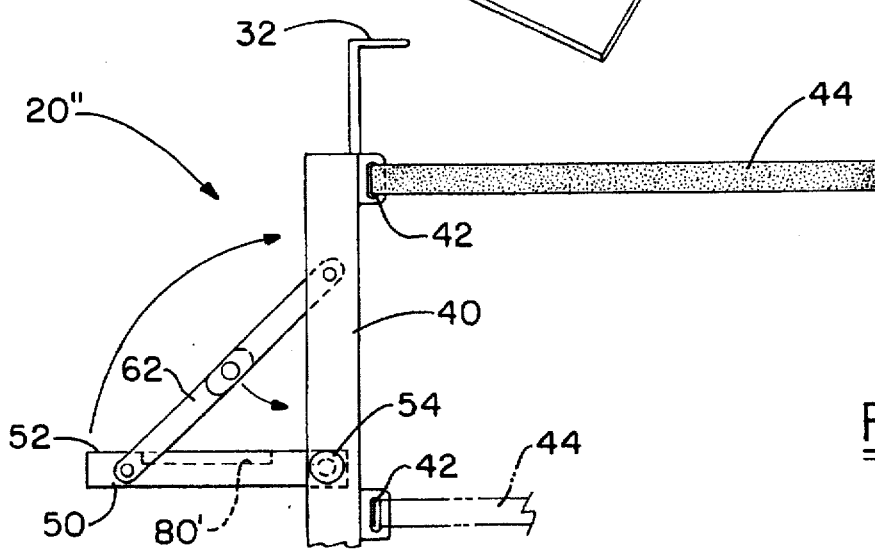
FIG. 10 illustrates an alternative frame member for connecting the cup holder of the present invention to a transit bus fare collection box.

Yet a further alternative attachment member for attaching a cup holder 20" to a wide variety of fare collection boxes as may be encountered on different make and model transit buses is shown in FIG. 10. Cup holder 20" includes a substantially rigid frame member 40 designed to lie adjacent to a vertical surface 12 (FIG. 1) found on a fare collection box 10. Frame member 40 includes one or more eyelets 42 for receiving one or more straps 44 such that straps 44 are connected to frame member 40. Straps 44 may be connected to frame member 40 using any other suitable arrangement, and the invention is not meant to be limited to the arrangement shown. Straps 44 may include buckles, snaps, hook and loop type fastening elements (sold under the trademark VELCRO®, or any other suitable fastening elements such that straps 44 may be releasably yet securely fastened around a transit bus fare collection box to thereby secure cup holder 20" to fare collection box 10. A hook member 32 may also be provided to prevent downward movement of cup holder 20" once cup holder 20" is positioned around fare collection box 10.

Yet another example of a suitable arrangement for providing a pivoting shelf member 50 is shown in FIG. 10 wherein shelf member 50 is pivotally connected to frame member 40 using any suitable hinge mechanism. A foldable support member 62 is provided and extends upward from shelf member 50 to connect with frame member 40. Shelf 50 may be folded upward and latched in position when not in use, or may be folded downward to its operative position as shown in FIG. 10 such that a substantially horizontal surface 52 is presented to support beverage containers. When shelf 50 is moved to the operative position as shown, supports are fully extended and prevent further downward movement of shelf 50.

As mentioned previously, a latch mechanism is preferably provided to maintain shelf 50 in a storage position such as when shelf 50 is folded upward or downward adjacent to fare collection box 10 and frame 30. A latch mechanism prevents shelf member 50 from swinging in response to bumps encountered by the transit bus, and, in the case where shelf member 50 includes a spring-loaded hinge 56, a latch prevents the shelf from assuming its operative position under the force of the hinge until the bus driver desires to use the cup holder 20. One example of a suitable latch mechanism is shown at 90 in FIGS. 2, 4, and 9. Latch mechanism 90 includes a spring-loaded pin 92 that is forced in an aperture 58 formed in shelf member 50 under the force of a coil spring 94 when shelf 50 is in its storage position. When the driver desires to pivot shelf 50 to its operative position, pin 92 is pulled outward from aperture 58 such that shelf 50 is free to pivot upward or downward to the operative position. An alternative arrangement for a latch mechanism is shown in FIG. 8 wherein a resilient latch member 70 is connected at one end 72 to frame 30' and includes a protuberance or protrusion 74 at the other end. When shelf 50 is folded downward, shelf 50 is maintained between protrusion 74 and frame 30'. When the transit bus driver desires to move the shelf 50 to its operative position, latch member 70 is deflected downward as is shown in broken lines to allow shelf 50 to be pivoted away from frame 30'. Any other suitable latch mechanism may be utilized to secure shelf 50 in its storage position and the invention is not meant to be limited to the examples shown.

While the foregoing description has set forth the preferred embodiments of the invention in particular detail, it must be understood that numerous modifications, substitutions and changes can be undertaken without departing from the true spirit and scope of the present invention as defined by the ensuing claims.

What is claimed is:

1. A cup holder for use on a transit bus having a fare collection box, said cup holder comprising:

an attachment member for engaging said transit bus fare collection box;

a shelf member connected to said attachment member to provide a substantially horizontal surface for retaining a beverage container wherein said shelf member is pivotally connected to said attachment member such that said shelf member may be positioned in at least a storage position and an operative position;

a support member connected to said attachment member and selectively engageable with said shelf member when said shelf member is in said operative position.

2. A cup holder for use on a transit bus having a fare collection box, said cup holder comprising:

an attachment member for engaging said transit bus fare collection box wherein said attachment member is a frame comprising a plurality of slidably interconnected frame components such that the position of said interconnected frame components may be adjusted relative to one another to thereby alter the size of said frame member;

a shelf member connected to said attachment member to provide a substantially horizontal surface for retaining a beverage container.

3. A cup holder as recited in claim 2, wherein said cup holder further comprise at least one set screw for selectively frictionally engaging said interconnected frame components in a fixed position relative to one another.

4. A cup holder for use on a transit bus having a fare collection box, said cup holder comprising:

an attachment member for engaging said transit bus fare collection box; a shelf member connected to said attachment member to provide a substantially horizontal surface for retaining a beverage container wherein said shelf member is pivotally connected to said attachment member such that said shelf member may be positioned in at least a storage position and an operative position;

at least one foldable support connected between said shelf member and said attachment member such that said at least one foldable support folds to allow said shelf member to be moved to said storage position and said foldable support extends to support said shelf member in said operative position.

5. A cup holder for use on a transit bus having a fare collection box, said cup holder comprising:

an attachment member for engaging said transit bus fare collection box;

a shelf member connected to said attachment member to provide a substantially horizontal surface for retaining a beverage container wherein said shelf member is pivotally connected to said attachment member such that said shelf member may be positioned in at least a storage position and an operative position;

wherein said cup holder further comprises at least one spring to urge said shelf member into said operative position;

wherein said at least one spring is provided in association with a spring-loaded hinge pivotally connects said shelf member to said attachment member.

6. A cup holder for use on a transit bus having a fare collection box, said cup holder comprising:

an attachment member for engaging said transit bus fare collection box;

a shelf member connected to said attachment member to provide a substantially horizontal surface for retaining a beverage container wherein said shelf member is pivotally connected to said attachment member such that said shelf member may be positioned in at least a storage position and an operative position;

a latch mechanism for selectively engaging said shelf member when said shelf member is pivoted into said storage position such that said latch selectively maintains said shelf member in said storage position.

7. A cup holder as recited in claim 6, wherein said latch mechanism comprises a spring-loaded pin, and said shelf member comprises an aperture formed therein for selectively receiving said pin when said shelf member is moved to said storage position.

8. A cup holder as recited in claim 6, wherein said latch mechanism comprises a resilient member having a first end connected to said attachment member such that said resilient member engages said shelf member and maintains said shelf member adjacent to said attachment member when said shelf member is moved to said storage position.

* * * * *